United States Patent [19]

Sparks

[11] Patent Number: 5,567,010
[45] Date of Patent: Oct. 22, 1996

[54] ADJUSTABLE LUMBAR SUPPORT

[75] Inventor: Michael Sparks, Jacksonville, Ala.

[73] Assignee: Bostrom Seating, Inc., Piedmont, Ala.

[21] Appl. No.: 297,312

[22] Filed: Aug. 29, 1994

[51] Int. Cl.$^6$ ..................................................... A47C 3/025
[52] U.S. Cl. .................... 297/284.4; 297/284.1; 297/463.1
[58] Field of Search ................. 297/284.4, 284.1, 297/284.7, 284.3, 463.1

[56] References Cited

U.S. PATENT DOCUMENTS

| | | | |
|---|---|---|---|
| 1,580,606 | 4/1926 | Jones | 297/284.1 X |
| 3,241,879 | 3/1966 | Castello et al. | 297/284.4 |
| 3,378,299 | 4/1968 | Sandor | 297/284.1 X |
| 4,316,631 | 2/1982 | Lenz et al. | 297/284.1 |
| 4,350,388 | 9/1982 | Weiner | 297/284.4 X |
| 4,880,271 | 11/1989 | Graves | 297/284.4 |
| 4,993,164 | 2/1991 | Jacobsen | 297/284.4 X |
| 5,050,930 | 9/1991 | Schuster et al. | 297/284.4 |
| 5,197,780 | 3/1993 | Coughlin | 297/284.4 X |
| 5,217,278 | 6/1993 | Harrison et al. | 297/284.4 X |
| 5,316,371 | 5/1994 | Bishai | 297/284.1 X |

FOREIGN PATENT DOCUMENTS 487420   6/1938   United Kingdom ................. 297/284.4

*Primary Examiner*—Milton Nelson, Jr.
*Attorney, Agent, or Firm*—Godfrey & Kahn, S.C.

[57] ABSTRACT

A lumbar support for a seat which has a back and a seat portion. The back of the seat contains the lumbar support and is adapted to recline with respect to the seat portion. The lumbar support includes two flexible lumbar supports, a fixed support member, a movable support member, a track for guiding the movable support member along a predetermined path of travel, and an assembly for advancing the movable support member to adjust the curvature of the flexible lumbar supports.

18 Claims, 4 Drawing Sheets

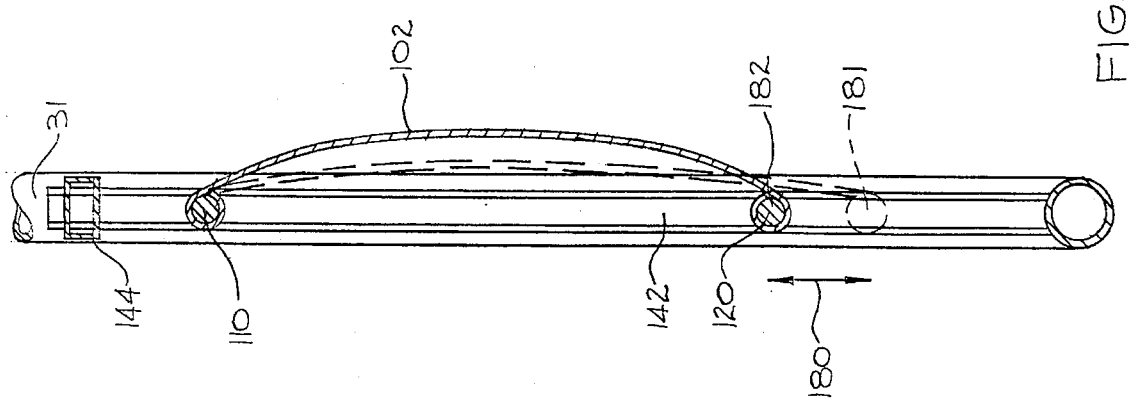

ADJUSTABLE LUMBAR SUPPORT

TECHNICAL FIELD

The present invention generally relates to an adjustable lumbar support that is particularly suited for use in combination with seating for overland vehicles and the like.

BACKGROUND PRIOR ART

Seating manufacturers have long understood the problems associated with designing seats to adequately support the lumbar portion of an individual's back. Seats designed to support the lumbar region have generally included an outwardly curved portion which is appropriately positioned to support the inwardly curved lumbar portion of the back. This design helps reduce fatigue and stress on the individual and improves the overall comfort of the seating.

One well-known shortcoming associated with conventional lumbar support seat designs is that they are not adjustable to fit the shape of the particular individual sitting in the seat. This is despite the fact that individuals have spines of different shapes and sizes. Further, the shape or curvature of the lumbar region also varies when a person changes their seating position. Consequently, a given seat cannot be used comfortably by a variety of individuals who have spines which have different sizes and shapes. Additionally, the prior art seating also does not provide adequate support to individuals when they change from one position to another, such as when an individual leans forward or backward in the seat.

An additional shortcoming applicable to the prior art seating is that the upper portion of the seat back is often designed to pivot or recline with respect to the lower portion of the seat. In this regard, the lumbar support is normally supported by the seat back for these reclining type seats. When designed in this fashion, the lumbar support tends to interfere with the reclining action of the seat.

A still further problem is that for many applications space is limited and the thickness of the seat must be minimized. As should be understood, seat backs for conventional seats equipped with adjustable lumbar supports tend to be bulky and thick. Additionally, many lumbar support designs contain component elements that are oriented perpendicular to the frame of the seat back. These design features increase the thickness of the seat and consequently render it inefficient for use in vehicles where space considerations are of great concern.

A still further problem with the prior art assemblies is that their weight is sometimes prohibitive. In this regard, strict weight limitations are often imposed by vehicle manufacturers for the seats used in their vehicles due to fuel efficiency concerns. Of course, the fewer and the lighter the components in the seat and lumbar support the better.

A still further problem is the reliability and durability of the seat and lumbar support. For example, some conventional adjustable lumbar supports utilize an inflatable diaphragm for pushing the seat back forward to provide the support for the individual's lumbar region. These lumbar support systems utilize air pumps, hoses, and release valves to expand and contract the diaphragm. As should be readily apparent when a pump or valve fails, the lumbar support would not be adjustable. In addition, should the diaphragm or hose rupture or be punctured, the integrity of the lumbar support would be lost.

A still further problem with the prior art is that vehicle seats are subjected to forces from virtually every possible direction. These forces occur when the vehicle takes a turn, accelerates or decelerates, or hits a bump, pot hole, or curb. The seat and associated lumbar support should be structured to withstand these forces and maintain its integrity, even during an automobile accident.

A still further shortcoming with the prior art is that lumbar supports of previous designs do not distribute force evenly across the lumbar region. As should be understood, the human back contains a variety of elements, such as a hard rigid spine, flexible ribs, and soft muscles and skin tissue. An effective lumbar support must distribute support evenly over the surface of the lumbar region without pinching soft muscle and tissue between the support and the spine or ribs of the individual.

A still further problem with the prior art assemblies is that the manufacturing costs of same have been excessive. In this regard, the cost and number of components making up the seat and lumbar support should be kept to a minimum. Further, the lumbar support should also be efficiently incorporated into the seat design to avoid expensive and time consuming manufacturing procedures and the costs.

The present invention is provided to solve these and other problems.

SUMMARY OF THE INVENTION

The present invention relates to a lumbar support for a seat having a back and a seat portion. The seat back contains the lumbar support and is operative to recline with respect to the seat portion. The lumbar support generally includes two flexible lumbar supports, a fixed support member, a movable support member, a track for guiding the movable support member along a predetermined path of travel, and an adjustment assembly for advancing the moveable support member to adjust the curvature of the flexible lumbar supports. One end of each lumbar support is secured to the fixed support member. A second end of each lumbar support is secured to the movable support member. The fixed support member and guide track are rigidly secured to the frame of the back rest. The movable support member is adapted to move along the path of travel defined by the guide track. The support members are substantially parallel to each other and in substantially the same plane as the guide track and adjustment assembly. As the movable support member is advanced toward the fixed support member, the lumbar supports curve or bow outwardly, thereby projecting from the frame of the seat back.

One advantage of the present invention is its ability to adjust to the varying spinal shapes of different people. The curvature of the lumbar support member can be increased or decreased by advancing the movable support member closer to or further away from the fixed support member. The flexibility of the lumbar supports also permits each lumbar support to individually flex and adjust to the shape of an individual's lumbar region independent of the other lumbar support and independent of the position of the fixed and movable support members. This combination of adjustability and flexibility permits the seat to be used comfortably and effectively by individuals of various heights, weights, and shapes. The adjustability and flexibility of the lumbar supports also permits the seat to provide adequate support to an individual when they change from one position to another.

An additional advantage of the present invention is that the upper portion of the seat or seat back can freely pivot or recline with respect to the lower portion of the seat.

A still further advantage of the present invention is that it does not substantially increase the thickness of the back rest. In this regard, the lumbar support elements are all oriented in substantially the same plane as the seat back. Accordingly, the seat can be utilized in vehicles where space considerations are a concern.

A still further advantage of the present adjustable lumbar support is that it is relatively light weight in construction. As should be understood, the number and type of components used in the lumbar support do not significantly add to the weight of the seat. This is of particular importance as noted above, with respect to the fuel efficiency of vehicles.

A still further advantage of the present invention is its reliability and durability. No easily damaged components are utilized. Instead, a simple adjustment assembly is employed which includes a knob for manually rotating a threaded shaft, which in turn moves a link and the movable support member to adjust the curvature of the lumbar supports. This assembly is both dependable and easy to operate.

A still further advantage of the present invention is its ability to withstand the forces produced by a moving vehicle. As should be understood, the seat and accompanying lumbar support assembly are designed to withstand forces that occur when the vehicle turns, accelerates and decelerates, as well as when the vehicle passes over or engages bumps, pot holes, curbs and changes in the pitch of the road.

A still further advantage of the present invention is that it is designed to inhibit the pinching of soft muscle and skin tissue between the lumbar supports and the spine of an individual. The lumbar supports are spaced apart to prevent direct contact with the occupant's spine. Additionally, the individual supports either engage the soft muscle and skin tissue or the more flexible ribs located in the lower back just above the lumbar region. The flexibility of the individual support members themselves also helps to reduce pinching.

A still further advantage of the present invention is found in its inexpensive component costs and its relative ease of manufacture. For example, the present lumbar support can be manufactured using inexpensive tubes, role stock and other relatively inexpensive materials. Additionally, the lumbar support can also be efficiently incorporated into an existing seat design so that expensive and time consuming manufacturing procedures are avoided.

Other features and advantages of the invention will be apparent from the following specification taken in combination with the following drawings.

BRIEF DESCRIPTION OF DRAWINGS

FIG. 4 is a transverse vertical sectional view taken along the line labeled 4—4 in FIG. 2 and showing the advancement of the movable support member along a predetermined path of travel from a first position, wherein the lumbar support is oriented in a relatively flat position, to a second position, wherein the lumbar support bows outwardly from the seat back.

DETAILED DESCRIPTION

Figure 1:
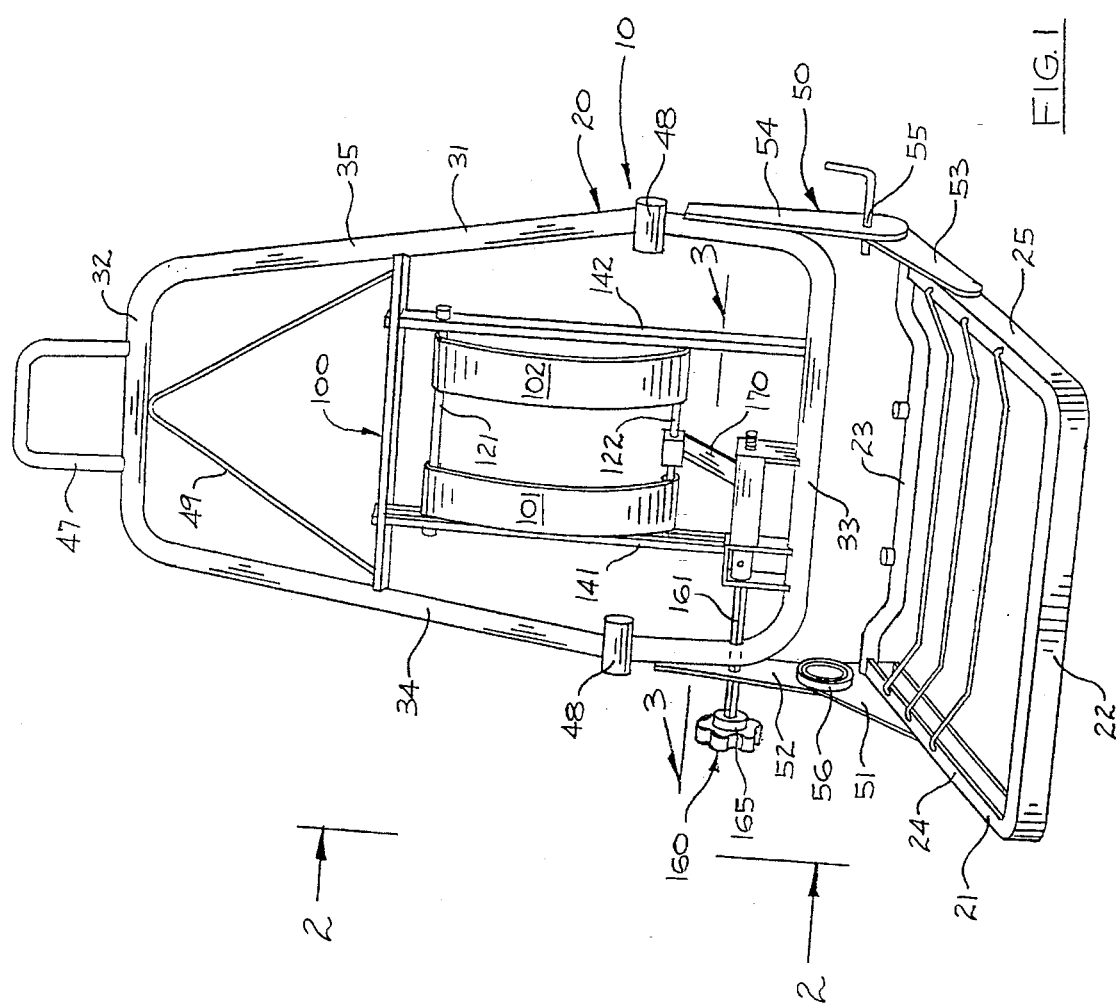
FIG. 1 is a perspective view of a seat having a seat portion and a pivotable seat back equipped with the lumbar support of the present invention.

While this invention is susceptible of embodiments in many different forms, there is shown in the drawings and will herein be described in detail, a preferred embodiment of the invention with the understanding that the present disclosure is to be considered as an exemplification of the principles of the invention and is not intended to limit the broad aspects of the invention to the embodiment illustrated.

As shown in FIG. 1, the present invention is installed on or made integral with a seat 10. The seat 10 includes a frame 20 that defines a lower portion or seat portion 21, an upper portion or seat back 31, a reclining assembly 50, and a lumbar support assembly 100. As should be understood, reclining assembly 50 adjustably fixes the seat back 31 into any desired angulated orientation with respect to seat portion 21. The lumbar support assembly 100 is mounted inside or within the seat back 31 (when fully assembled) and has a substantially planar orientation with respect to the seat back. Although not shown, it should be understood that a completed seat 10 will include exterior facing upholstery and a durable seat covering. It should also be understood that seat portion 21 is intended to be mounted on a supporting surface of an overland vehicle.

The seat portion 21 includes front, rear, right and left frame members 22–25, respectively. The seat back 31 also includes top, bottom, right and left side frame members 32–35, respectively. The individual frame members 22–25 and 32–35 are preferably made of metal for strength and durability although other materials could be substituted. The individual frame members 32–35 are cylindrically shaped to achieve a strong light weight construction, and further provide the structure for carrying loads exerted on the seat back and transmitting those loads through the reclining assembly 50 and into seat portion 21. A head rest 47, arm rest mounts 48, and additional support members 49 may also be provided.

The reclining assembly 50 includes two pairs of brackets 51–54, a locking mechanism 55, and a return assembly 56. The first pair of brackets 51 and 52 are pivotally joined to each other at one end, and secured to the right side of the seat 10. The second pair of brackets 53 and 54 are also pivotally joined to each other at one end, and secured to the left side of the seat 10. The brackets 51 and 53 are secured to the rear frame member 23 of seat portion 21. Further brackets 52 and 54 are secured to the bottom frame member 33 of back rest 31. The locking mechanism 55 permits selective locking of the back rest 31 in a fixed angulated orientation with respect to seat portion 21. The return assembly 56 includes a coil spring for biasing seat back 31 to an upright position when the locking mechanism 55 is released.

Figure 2:
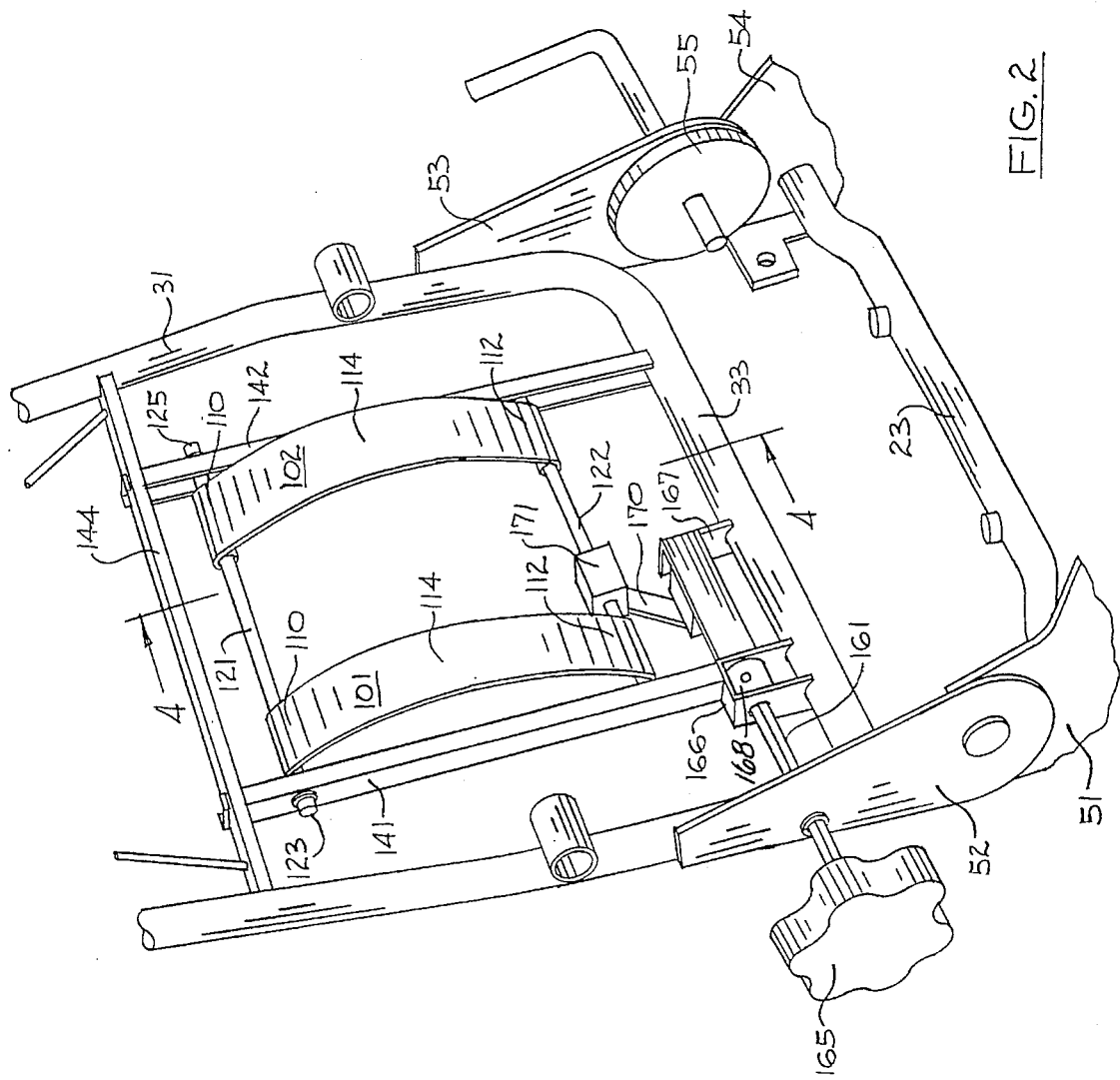
FIG. 2 is a fragmentary, enlarged, front plan view of a pivotable seat back frame equipped with the lumbar support of the present invention.

As best seen by reference to FIG. 2, the lumbar support assembly 100 is mounted to and generally positioned within seat back frame 31. The assembly 100 includes a right lumbar support 101, a left lumbar support 102, a fixed upper rod 121, an adjustable or movable lower rod 122, a right guide track 141, a left guide track 142, and an adjustment assembly 160 for selectively advancing the lower rod along a predetermined path of travel 180 until the lumbar supports achieve a desired degree of curvature.

Lumbar supports 101 and 102 are made of a flexible plastic that tends to flex to conform to the specific shape of the occupant's back when the occupant rests against the seat back 31. The specific properties of the plastic used to form the lumbar supports 101 and 102 are discussed in more detail below. The supports 101 and 102 are about eight inches in length (22.86 cm), two inches in width (5.8 cm) and ⅛ inch (0.34 cm) in thickness. Each lumbar support 101 or 102 has a top or first end 110, a bottom or second end 112 and a middle or intermediate section 114.

Lumbar supports 101 and 102 are movably secured on rigid metal rods or support members 121 and 122 respectively. The top end 110 of each of the lumbar supports 101 and 102 are secured to the upper rod 121. The bottom end 114 of each lumbar supports are also secured to the lower rod 122. Each end 110 and 112 forms an integral loop for matingly receiving the individual rods 121 and 122. Although the loops of the lumbar supports 101 and 102 closely hold the rods 121 and 122, the lumbar supports do rotate around the rods 121 and 122, as discussed in greater detail below. The lumbar supports 101 and 102 are spaced a predetermined distance apart on rods 121 and 122 so that they do not engage the spine of the occupant. In this regard, lumbar support 101 is located proximal the ends 123 and 124 of rods 121 and 122, respectively. Further, lumbar support 102 is located proximal the ends 125 and 126 of each of rods 121 and 122, respectively.

Guide tracks 141 and 142 are manufactured from metal or some other durable material and form a pair of U-shaped channels for receiving each of the ends 124 and 126 respectively of the adjustable rod 122. The guide tracks 141 and 142 are substantially parallel one to the other and are spaced apart a predetermined distance slightly less than the length of the fixed rod 121 and slightly greater than the length of the adjustable rod 122. The top end of each guide track 141 and 142 is welded or otherwise secured by fasteners to a cross bar 144. Each end of cross bar 144 is welded or otherwise secured to one of the frames 34 or 35 of the seat back frame 31. The bottom or lower end of guide track 141 is welded or otherwise secured to a U-shaped mounting member 166. Further the bottom or lower end of the guide track 142 is welded on the bottom frame member 33 of the seat back frame 31. As best seen in FIG. 2, the upper rod 121 fits through an aperture formed in each of the guide tracks 141 and 142. This prevents the rod from moving laterally. As should be understood, neither the fixed rod 121, nor the top or first ends 110 of the individual lumbar supports 101 and 102 can move up or down relative to the respective guide tracks 141 and 142. The opposite ends 123 and 125 of the fixed rod 121 are caped, welded or otherwise secured to the respective guide tracks 141 and 142 to prevent the rod from sliding longitudinally and out of engagement with the individual guide tracks.

Guide tracks 141 and 142 form a predetermined plane and path of travel through which the adjustable rod 122 travels. The adjustable rod 122 (as noted above) has a predetermined length dimension so that the opposite ends 124 and 126 slidably engage and matingly fit into the U-shaped channels defined by the respective guide tracks 141 and 142. The guide tracks 141 and 142 are further sized to permit sliding engagement of the adjustable rod 122 as it moves through its predetermined path of travel 180. Although the individual guide tracks 141 and 142 are shown in a linear configuration, it should be understood that the guide tracks could be formed into a somewhat arcuate shape if desired.

Figure 3:
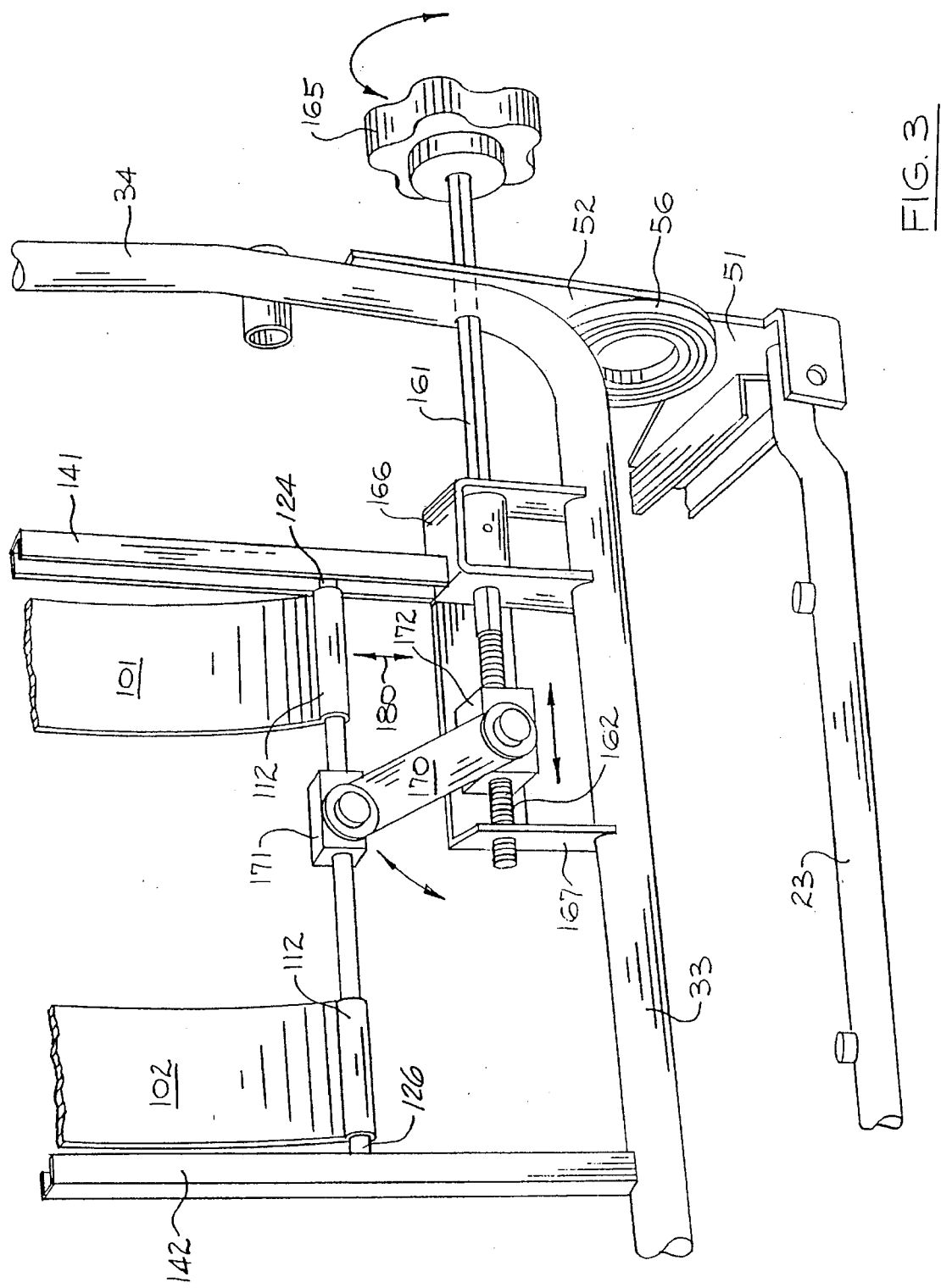
FIG. 3 is a fragmentary, enlarged, rear plan view of the lumbar support showing the pivotable seat back frame, a manually actuatable knob and associated rotatable shaft, a link, a movable support member engaging a guide track, and a pair of lumbar supports.

As best seen in FIG. 3, the adjustment assembly 160 includes a rotatable shaft 161, a manually activatable knob 165, a link 170, and first and second coupling blocks 171 and 172 respectively. The knob 165 is rigidly secured to one end of the rotatable shaft 161. The rotatable shaft 161 is threaded a predetermined amount at its opposite end 162, as discussed in more detail below. The rotatable shaft 161 is mounted on the bottom frame member 33 of the back rest frame 31 by means of a U-shaped mounting member 166. An end support member 167 is employed to support the rotatable shaft 161 at its threaded end 162. The opposite end of rotatable shaft 161 passes through a hole in the right frame member 34 of seat back 31 and a coaxially aligned aperture in bracket 52. This construction provides additional support for the rotatable shaft 161 near the knob 165. As seen in FIG. 3, each of the components forming the adjustment assembly 160 are in substantially the same plane as the back rest frame 31 and the individual guide tracks 141 and 142. This construction, of course, minimizes the overall thickness of back rest 31.

As mentioned above, rotatable shaft 161 is supported by U-shaped mounting member 166, endwardly disposed support member 167 and seat back frame 31. Longitudinal movement of shaft 161 is inhibited by cylindrical member 168 which is fixed on the shaft 161 and received in the U-shaped mounting member 166. This construction allows shaft 161 to rotate about its longitudinal axis while keeping the shaft transversely stationary.

One end of link 170 is pivotally mounted to a first coupling block 171, and its opposite end is pivotally attached to a second coupling block 172. Coupling block 171 is rigidly secured to the lower rod 122 and preferably oriented between the lumbar supports 101 and 102 and near the midpoint of the second or lower rod. Coupling block 172 threadably mates with the threaded end 162 of the rotatable shaft 161. When rotatable shaft 161 is turned, coupling block 172 travels toward or away from knob 165. For example, when coupling block 172 moves toward knob 165, link 170 pulls lower rod 122 down along predetermined path of travel 180 which is defined by guide tracks 141 and 142 and into a first position 181. This causes individual lumbar supports 101 and 102 to assume an almost coplaner attitude such that middle sections 114 do not project outwardly from seat back 31. On the other hand, when the coupling block 172 moves away from knob 165, link 170 pushes lower rod 122 up along path of travel 180 and into a second position 182. This causes the middle sections 114 of lumbar supports 101 and 102 to curve or bow out from seat back 31 and the ends 110 and 112 of the respective supports to rotate about individual rods 121 and 122. This is best imagined by a study of FIG. 4. In first position 181, the individual rods 121 and 122 are about eight inches apart which is substantially the length dimension of the respective lumbar support members 101 and 102. In second position 182, rods 121 and 122 are about seven inches apart. The second position 182 represents the minimum distance apart that the respective rods 121 and 122 can be separated by the adjustment assembly 160 given the length of threads 162 on the shaft 161, the length of link 170 and the position of the threads relative to the link. This causes the individual lumbar supports 101 and 102 to project outwardly about one and a half inches (3.81 cm).

As mentioned above, the individual lumbar supports 101 and 102 are preferably made of a flexible plastic that enables supports 101 and 102 to conform to the shape of the occupant's back while providing the necessary stiffness and durability for supporting the lumbar region of the occupant's back. Lumbar supports 101 and 102 are normally flat when disposed in their relaxed state. Further the lumbar supports have the physical, mechanical and thermal properties shown in Table A. Although the use of the specified plastic identified in Table A is preferred, it should be understood that lumbar supports 101 and 102 could be made of other materials having substantially similar properties.

TABLE A

Material: Acetal
Color: Black

| PROPERTIES | | ASTM METHOD |
|---|---|---|
| PHYSICAL | | |
| Specific Gravity | 1.41 | D792 |
| Water Absorption: | | |
| 24 hours @ 73° F. | 0.22% | D570 |
| @ equilibrium | 0.8% | D570 |
| Mold Shrinkage: | | |
| flow direction | 22 mils/in | D955 |
| transverse direction | 18 mils/in | D955 |
| MECHANICAL AND THERMAL | | |
| Tensile Strength @ Yield −40° F. | 13,700 psi | D638 |
| 73° F. | 8,800 psi | D638 |
| 160° F. | 5,000 psi | D638 |
| Elongation @ Break −40° F. | 20% | D638 |
| 73° F. | 60% | D638 |
| 160° F. | >250% | D638 |
| Flexural Stress @ 5% Deformation | $13.0 \text{ psi} \times 10^3$ | D790 |
| Flexural Modulus: 73° F. | $37.5 \text{ psi} \times 10^4$ | D790 |
| 160° F. | $18.0 \text{ psi} \times 10^4$ | D790 |
| 220° F. | $10.0 \text{ psi} \times 10^4$ | D790 |
| Fatigue Endurance (Limit @ 10 Cycles) | 4,100 psi | D671 |
| Compressive Strength: @ 1% Deflection | 4,500 psi | D695 |
| @ 10% Deflection | 16,000 psi | D695 |
| Rockwell Hardness: | MBO | D785 |
| IZOD Impact Strength: −40° F. (Notched) | 1.0 ft-lb/in | D256 |
| 73° F. (Notched) | 1.3 ft-lb/in | D256 |
| Tensile Impact Strength: | 70 ft-lb/sq.in | D1B22 |
| Heat Deflection: @ 66 psi | 315° F. | D64B |
| @ 264 psi | 230° F. | D64B |
| Shear Strength: 73° F. | 7,700 psi | D732 |
| 120° F. | 6,700 psi | D732 |
| 160° F. | 5,700 psi | D732 |

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

Having described my invention, what I claim as new and desire to secure by Letters Patent of the United States is:

1. An adjustable lumbar support for a seat comprising:
   a frame adapted to be borne by the seat;
   a flexible, lumbar support having a first end, a second end and a middle portion, the middle portion being operable to curve outwardly from the ends;
   a first support member supporting the first end of the lumbar support and a second support member supporting the second end of the lumbar support, the first and second members being borne by the frame; and
   an adjustment assembly for changing the curvature of the lumbar support by moving the first support member relative to the second support member, the adjustment assembly having a rotatable shaft and a link that is pivotally coupled to one of either the rotatable shaft and one of the support members, and wherein the first support member is fixed relative to the frame and the second support member is movable along a predetermined path of travel in the direction of the first member.

2. An adjustable lumbar support as claimed in claim 1, and wherein the fixed and movable support members define a plane, and wherein the movable support member remains in the plane as it moves along the path of travel and wherein the middle portion of the flexible lumbar support moves transverse to the plane.

3. An adjustable lumbar support as claimed in claim 2, wherein the shaft is rotatable about its longitudinal axis and is rotatably supported by the frame, and wherein the link has a predetermined length dimension, and wherein the first end of the link is disposed in force transmitting relation relative to the movable support member, and wherein the second end of the link is mounted on the rotatable shaft.

4. An adjustable lumbar support as claimed in claim 3, and wherein the rotatable shaft has a threaded portion, and wherein the rotatable shaft is substantially transversely stationary with respect to the frame, and wherein the first end of the link is pivotally mounted on the movable support member by a first coupling block, and the second end of the link is mounted on a second, threaded coupling block which is threadably engaged by the threaded portion of the rotatable shaft, and wherein the second threaded, coupling block carries the second end of the link along the rotatable shaft when the rotatable shaft is rotated about its axis.

5. An adjustable lumbar support as claimed in claim 4, and wherein the first end of the lumbar support freely pivots about the fixed support member and wherein the second end of the lumbar support freely pivots about the movable support member.

6. An adjustable lumbar support as claimed in claim 5, and further comprising a guide track which engages and directs the movable support member along the predetermined path of travel from a first position to a second position, and wherein the path of travel of the movable support member is linear.

7. An adjustable lumbar support as claimed in claim 6, and further comprising a manually activatable knob which is mounted in force transmitting relation relative to the rotatable shaft, and wherein rotation of the knob imparts rotation to the shaft.

8. An adjustable lumbar support as claimed in claim 7, and further comprising a second, flexible lumbar support, and wherein the first and second lumbar supports are spaced a predetermined distance apart, and wherein the first lumbar support is located proximal the first end of the respective supporting members, and the second lumbar support is located proximal the second end of the respective supporting members.

9. An adjustable lumbar support as claimed in claim 8, and wherein the frame has first and second sides, and wherein the lumbar supports are generally coplaner relative to the first and second sides of the frame for alignment with the curvature of the spine of an individual, and wherein the fixed and movable support members are substantially perpendicular relative to the lumbar supports.

10. A seat having a lumbar support assembly for adjustably supporting an inwardly curved lumbar portion of a spine of an individual, the seat comprising:
    a lower frame having a rearmost portion;
    an upper frame borne by the lower frame and operable to support the spine of the individual, the upper frame having a lowermost portion which is pivotally mounted on the rearmost portion of the lower frame;
    a lumbar support borne by the upper frame and having a first end, a second end, and a middle portion, and wherein the middle portion is operable to curve outwardly from the upper frame;
    a first supporting member supporting the first end of the lumbar support, and a second supporting member supporting the second end of the lumbar support, and wherein the first and second members are borne by the upper frame; and an adjustment assembly for changing the curvature of the lumbar support by moving the first support member relative to the second support member, the adjustment assembly having a rotatable shaft and a link that is pivotally coupled to one of either the rotatable shaft and one of the support members, and wherein the first support member is fixed relative to the frame and the second support member is movable along a predetermined path of travel in the direction of the first member.

11. An adjustable lumbar support as claimed in claim 10, and wherein the first and second support members define a plane, and wherein the second member remains in the plane as it moves along the path of travel, and wherein the middle portion of the flexible lumbar support moves substantially transverse relative to the plane.

12. An adjustable lumbar support as claimed in claim 11, and wherein the shaft is rotatably supported by the upper frame and wherein the link has a predetermined length dimension, and wherein the first end of the link is disposed in force transmitting relation relative to the second support member, and wherein the second end of the link is mounted on the rotatable shaft.

13. An adjustable lumbar support as claimed in claim 12, and wherein the rotatable shaft has a threaded portion, and wherein the rotatable shaft is substantially transversely stationary relative to the upper frame, and wherein the first end of the link is pivotally mounted on the second support member by a first coupling block, and the second end of the link is mounted on a second, threaded, coupling block which is threadably engaged by the threaded portion of the rotatable shaft, and wherein the threaded coupling carries the second end of the link along the rotatable shaft when the rotatable shaft is rotated about its axis.

14. An adjustable lumbar support as claimed in claim 13, and wherein the first end of the lumbar support is free to pivot about the first support member and wherein the second end of the lumbar support is free to pivot about the second support member.

15. An adjustable lumbar support as claimed in claim 14, and further comprising a guide track for engaging and directing the second support member along the predetermined path of travel from a first position to a second position, and wherein the path of travel of the movable support member is substantially linear.

16. An adjustable lumbar support as claimed in claim 15, and further comprising a manually activatable knob which is disposed in force transmitting relation relative to the rotatable shaft, and wherein rotation of the knob imparts rotation to the shaft.

17. An adjustable lumbar support as claimed in claim 16, and further comprising a second, flexible lumbar support, and wherein the first and second lumbar supports are spaced a predetermined distance apart, and wherein the first lumbar support is located proximal the first end of the respective supporting members, and the second lumbar support is located proximal the second end of the respective supporting members.

18. An adjustable lumbar support as claimed in claim 17, and wherein the lumbar supports are generally coplaner relative to the upper frame for alignment with the curvature of the spine of an individual, and wherein the fixed and movable support members are substantially perpendicular relative to the lumbar supports.

* * * * *